United States Patent [19]

Andreades et al.

[11] 3,919,227

[45] Nov. 11, 1975

[54] COPOLYMERS OR CYCLOPROPENES WITH POLYMERIZABLE ETHYLENIC COMPOUNDS

[75] Inventors: Sam Andreades; Richard L. Baird, both of Wilmington, Del.

[73] Assignee: E. I. Du Pont de Nemours & Company, Wilmington, Del.

[22] Filed: Oct. 2, 1970

[21] Appl. No.: 77,724

Related U.S. Application Data

[63] Continuation-in-part of Ser. No. 832,841, June 12, 1969, abandoned.

[52] U.S. Cl...... 260/85.5 R; 204/159.23; 260/63 R; 260/63 N; 260/73 R; 260/78.5 R; 260/78.5 N; 260/78.5 HC; 260/79.3 M; 260/79.5 C; 260/80.3 N; 260/80.78; 260/82.1; 260/82.3; 260/86.7; 260/87.3; 260/87.5 B; 260/87.5 C; 260/88.1 R; 260/88.2 R; 260/88.2 C; 260/464; 260/557

[51] Int. Cl.² . C08F 5/00; C08F 15/02; C08F 15/04

[58] Field of Search ...... 260/85.5 R, 85.5 HC, 93.1, 260/80, 89.5, 91.1, 91.5, 47, 67, 88.7, 89.7, 88.2, 80.3, 86.1, 87.5, 73, 82.1, 82.3, 83.7, 78.5, 79.3

[56] References Cited

UNITED STATES PATENTS

| | | | |
|---|---|---|---|
| 3,320,216 | 5/1967 | Butler | 260/93.1 |
| 3,413,275 | 11/1968 | Barkdoll et al. | 260/87.7 |
| 3,523,928 | 8/1970 | Blanchard | 260/85.5 B |
| 3,644,301 | 2/1972 | Anderson | 260/85.5 HC |

*Primary Examiner*—Jr. Wong
*Attorney, Agent, or Firm*—Anthony P. Mentis

[57] ABSTRACT

Described are random linear copolymers of certain cyclopropenes, e.g., cyclopropene or 1-methylcyclopropene, with certain ethylenically unsaturated or strained ring monomers, e.g., ethylene, acrylonitrile, 2-chlorobutadiene or 1-cyanobicyclo[1.1.0]butane. Prepared by direct interaction between the monomers, the copolymers are useful film- and fiber-formers.

19 Claims, No Drawings

COPOLYMERS OR CYCLOPROPENES WITH POLYMERIZABLE ETHYLENIC COMPOUNDS

RELATED APPLICATION

This application is a continuation-in-part of our earlier application Ser. No. 832,841 filed June 12, 1969, now abandoned.

BACKGROUND OF THE INVENTION

1. Field of the Invention

This invention relates to a new class of copolymers and more specifically to copolymers of cyclopropenes and unsaturated or strained ring comonomers or mixtures of unsaturated and/or strained ring comonomers that undergo addition polymerization in the presence of free-radical or coordination-type initiators.

2. Description of the Prior Art

The following references are of interest in connection with the present invention:

1. K. B. Wiberg and W. J. Bartley, J. Am. Chem. Soc., 82, 6375–80 (1960), which describes the "spontaneous" polymerization of cyclopropene to a polymer (no physical description) characterized by the absence of resonance in the vinyl and aliphatic $CH_2$ region and by a broad band in the region $\tau = 9.7$–$9.8$ (cyclopropane) as having the structure:

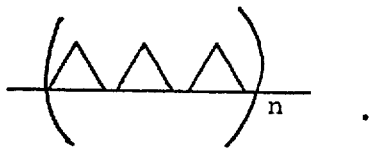

2. F. Fisher and D. E. Applequist, J. Org. Chem., 30, 2089 (1965), which indicates decomposition of 1-methyl cyclopropene ("probably polymerization") to a substance to which no structure is assigned. 3. G. L. Closs and L. E. Closs, J. Am. Chem. Soc., 85, 99–104 (p. 102) (1963), which mentions the ready polymerization of impure

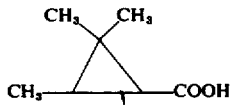

4. S. Murachashi, S. Nozakure, and M. Furne, Kobunshi Kagakn, 23 (255) 543 (1966), C.A. 67, 2131 (1967), which reports polymerization of cyclopropanes. With chloro substituted cyclopropane, dehydrochlorination was observed yielding polymers having cyclopropane rings in the main chain.

5. C. S. Marvel, J. H. Sample and Max F. Roy, J. Am. Chem. Soc., 61, 3241 (1939), which reports that the dehalogenation of polyvinyl chloride (and bromide) with zinc removed 84–87% of the Cl (85.9% of Br) to yield a soluble polymer which did not react with permanganate and was assigned the structure

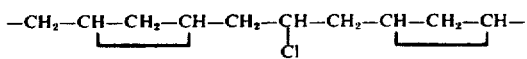

6. J. K. Hecht, Polymer Letters, 6, 395–401 (June, 1968), which reports that tetrachlorocyclopropene was copolymerized under free-radical conditions with styrene and vinyl acetate to give structures of the formula

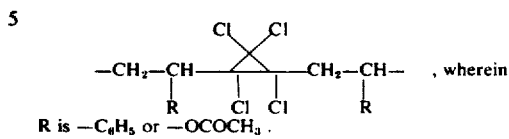

R is $-C_6H_5$ or $-OCOCH_3$.

Tetrachlorocyclopropene reportedly copolymerized poorly with acrylonitrile and not at all with methyl methacrylate.

7. M. Yamabe, Asahi Garasu Kenkyu Hokoku, 17 (2), 109–117 (1967) (translation): Polymerization of 1-Methyl-cyclopropene, shows homopolymerization of 1-methylcyclopropene in the presence of a coordination catalyst which promotes both double bond polymerization and ring-opening polymerization to yield a random copolymer containing the unit

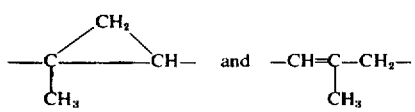

On the other hand, in the copolymers of the present invention, there is no double bond in the noncyclic repeating unit which forms part of the main chain of the copolymer.

8. Gale et al, J. Am. Chem. Soc. 88, 3617-23(1966) shows the reaction

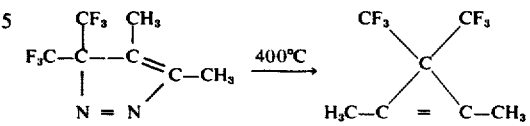

No disclosure appears to be present as to the polymerizability of the reaction product.

9. Barkdoll and Sargeant, U.S. Pat. No. 3,413,275 (1968) shows copolymerization of halotrifluorocyclopropenes of the formula

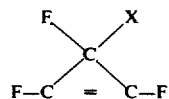

where X is fluorine, chlorine or bromine, with ethylenically unsaturated monomers.

SUMMARY AND DETAILS OF THE INVENTION

The products of this invention are random copolymers, that is, polymers formed from two or more chemically distinct monomers and thus containing at least two chemically distinct moieties or recurring units, and here include alternating copolymers. These copolymers are produced by the direct copolymerization of certain cyclopropenes and certain ethylenic and/or strained ring compounds. The resulting cyclopropane moiety (or moieties, when more than one cyclopropene is employed in the polymerization) in the copolymer may be represented by the symbol -continued

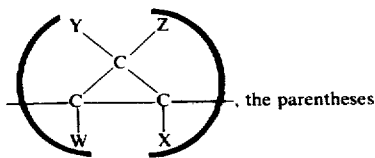

indicating the presence of at least one distinct recurring unit of the formula

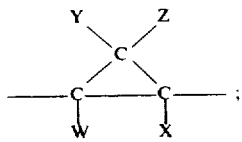

the resulting ethane moiety (or moieties) may be represented by the symbol

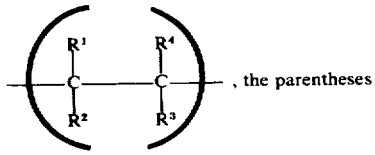

indicating the presence of at least one distinct recurring unit of the formula

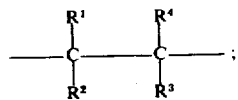

and the resulting strained ring moiety (or moieties) may be represented by the symbol

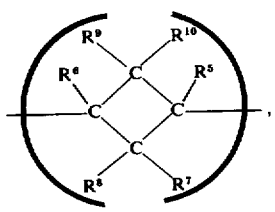

the parentheses indicating the presence of at least one distinct recurring unit of the formula

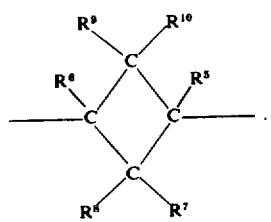

The recurring units within the respective parentheses may, of course, all be derived from the same monomer and may thus have the same formula.

In these formulae, W, X, Y and Z, which may be alike or different, are selected from hydrogen; alkyl of 1–18 and preferably of 1–8 carbon atoms; substituted alkyl in which the substituents may be hydroxy or lower alkoxycarbonyl; lower alkoxy; phenyl; substituted phenyl in which the substituents may be fluorine, chlorine, lower alkoxy or nitro; formyl; acetyl; carboxy; lower alkoxycarbonyl; cyano; carbamoyl or N,N-di(loweralkyl)-carbamoyl; with the proviso that Y and Z may each also be perfluoroalkyl of up to six carbon atoms, when W is hydrogen and X is cyano.

$R^1$ may be hydrogen, halogen, lower alkyl, lower alkenyl, phenyl, lower alkoxy, lower alkylcarbonyl (i.e., acyl), carboxy, lower alkoxycarbonyl, lower alkylcarbonyloxy (i.e., acyloxy), cyano, carbamoyl, or N,N-di(loweralkyl)-carbamoyl;

$R^2$ may be hydrogen, halogen, lower alkyl, vinyl, halovinyl, loweralkylvinyl, cyano, methylpyridinyl or phenylene sodium sulfonate;

$R^3$ may be hydrogen, halogen, carboxy or lower alkoxycarbonyl;

$R^4$ is selected from the group consisting of hydrogen or halogen; all of the foregoing with the proviso that $R^2$ and $R^3$ taken together may be an alkylene group of 2–6 carbon atoms;

$R^5$ and $R^6$ each may be hydrogen, halogen, hydroxyloweralkyl, hydroxyphenyl, lower-alkoxyloweralkyl, loweralkoxyphenyl, haloloweralkyl, halophenyl, -COOH, -COOR, -COSR, -COOM, -CONH$_2$, -CONHR, -CONR$_2$, -SO$_2$R, -CHO, -COR, -OCOR, -OR, -NO$_2$, -CN, or -R, wherein M is one equivalent of a metal cation and R is hydrocarbyl of up to 18 carbon atoms free of ethylenic and acetylenic carbon-to-carbon unsaturation, especially alkyl or lower alkyl; and $R^7$, $R^8$, $R^9$, and $R^{10}$ may be hydroxy, amino, -NR$_2$, or $R^5$, R being as above.

In the above definitions, "halogen" includes fluorine, chlorine, bromine and iodine, and "lower" means of up to 6 carbons in the hydrocarbon part of the radical, e.g., "lower alkyl" or "lower alkenyl" indicates alkyl or alkenyl of 6 or fewer carbon atoms. It is preferred that when more than 2 of the groups $R^1$ to $R^4$ inclusive are It no more than 2 of them should have an atomic number of greater than 9. it is to be understood that when $R^2$ is vinyl or substituted vinyl, the resulting diene may be copolymerized in 1,2 or 1,4 configurations or in a combination of these.

An empirical formula for the copolymers, which are film- and fiber-forming, may be written with the symbols above as:

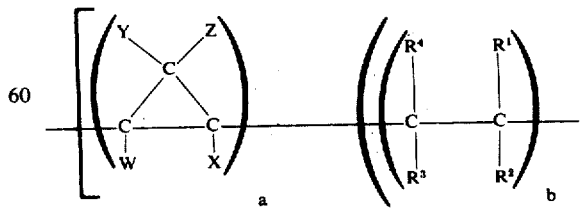

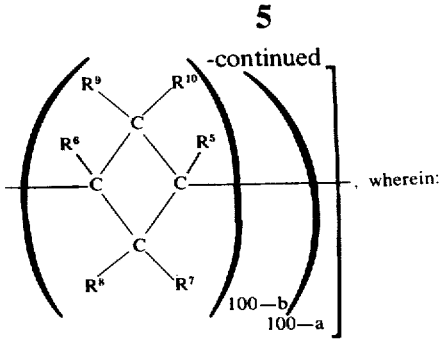

FORMULA I

*a* is the mole percent of recurring cyclopropane units in the copolymer, being any number, including decimal fractions, between 1 and 99 and *b* is any mole percentage from 0 to 100 inclusive. It will be understood that this formula does not indicate in any manner how or in what sequence the different recurring units appear in the linear polymer chain. The formula is, in fact, expressly intended to cover all the different random attachments, i.e., head-to-head, tail-to-head, etc., of one or more of the different cyclopropane moieties with one or more of the different ethane moieities and/or cyclobutane moieties found in all possible random isomers (cf. discussion below).

The copolymers of Formula I have molecular weights no less than about 500. In any given copolymer molecule there are no less than two of any of the monomer component units appearing therein. The copolymer structure is substantially linear.

In a preferred group of the copolymers of Formula I, b is 100 and at least one of W, X, Y, Z, $R^1$, $R^2$, $R^3$ or $R^4$ is one of the groups specified other than hydrogen. Still more preferred are copolymers of Formula I in which b is 100 and at least one of W, X, Y or Z is a group other than hydrogen and at least one of $R^1$, $R^2$, $R^3$ or $R^4$ is a group other than hydrogen or lower alkyl.

The cyclopropenes used in preparing the copolymers of this invention may be represented by the formula

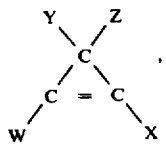

wherein W, X, Y and Z are as previously defined.

The cyclopropenes as defined above include such compounds as cyclopropene, 1-methylcyclopropene, tetramethylcyclopropene, 1,2,3-tri-n-propylcyclopropene, 1,2-dioctylcyclopropene, 1,2-di-n-butyl-3-hydroxymethylcyclopropene, sterculyl alcohol, methyl sterculate, 3-methoxy-1,2-di-n-propylcyclopropene, 3-methyl-1,2,3-triphenylcyclopropene, 3-carboxy-1,2-di(p-methoxyphenyl)cyclopropene, 3,3-di(methoxycarbonyl)-1-m-nitrophenyl-2-phenylcyclopropene, cyclopropene-1,3-dicarboxaldehyde, 1-acetylcyclopropene, 1-cyanocyclopropene, 3,3-dicyanocyclopropene, 1-carbamoylcyclopropene, 3-carbamoyl-1,2-dimethylcyclopropene, and 1-(N,N-dimethylcarbamoyl)cyclopropene.

The ethylenic compounds to be copolymerized with cyclopropenes in this invention may be represented by the formula

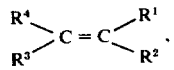

wherein $R^1$, $R^2$, $R^3$ and $R^4$ are also as defined previously.

Thus, the unsaturated polymerizable comonomers can be compounds such as olefins, for example, ethylene, propylene, isobutylene, isoprene and the like; vinyl monomers, for example, acrylonitrile, vinyl chloride, vinyl fluoride, styrene, butadiene, 2-chlorobutadiene, 2-cyanobutadiene, methacrylic acid, methyl methacrylate, acrylic acid, ethyl acrylate, butyl acrylate, acrylamide, methacrylamide, N,N-dimethylacrylamide, vinyl acetate, methyl vinyl ether, methyl vinyl ketone, sodium styrene sulfonate, 2-methyl-5-vinylpyridine, and the like; vinylidene monomers, for example α-methylstyrene, vinylidene chloride, vinylidene fluoride, vinylidene cyanide, and the like; 1,2-disubstituted ethylenes, for example fumaric and maleic esters, maleic anhydride, and the like; polymerizable perhalogenated ethylenes, for example, chlorotrifluoroethylene, tetrafluoroethylene, and the like; conjugated diolefins, for example, butadiene, isoprene, 2-chlorobutadiene, 2-cyanobutadiene; cyclic olefins, for example, cyclobutene, cyclopentene, cyclohexene, norbornene, and the like; substituted cyclic olefins, for example, cyclopropenes chemically distinguishable from the other cyclopropene comonomer.

A preferred group of ethylenically unsaturated monomers that is especially useful in forming the copolymers of this invention includes those members having the general formula $CH_2=CR^1R^2$. These monomers yield copolymers of Formula I in which $R^3$ and $R^4$ are hydrogen.

The strained ring compounds to be copolymerized with cyclopropenes in this invention may be represented by the formula

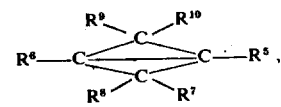

wherein $R^5$, $R^6$, $R^7$, $R^8$, $R^9$ and $R^{10}$ are also as defined previously. Thus the strained ring polymerizable comonomers can be bicyclic and polycyclic compounds, such as 1-cyanobicyclo[1.1.0]butane, 3-chloro-1-cyanobicyclo[1.1.0]butane, 1-acetylbicyclo[1.1.0]butane and the like.

In the copolymers of this invention, the amount of polymerized ethylenically unsaturated and/or strained ring comonomer or comonomers can be as high as 99 mole percent (i.e., as low as one mole percent polymerized cyclopropene), but preferably it is limited to a maximum of 98 mole percent and a minimum of 50 mole percent. Alternatively, it may be said that the polymers of this invention may be comprised of 1–99 mole percent polymerized cyclopropene and preferably 2–50 mole percent. The copolymers generally have an inherent viscosity in dimethylformamide at 25°C. of 0.1 or more.

The copolymers of this invention are prepared by reacting at least one cyclopropene monomer with at least one unsaturated and/or strained ring polymerizable monomer defined as above in bulk, dispersion, emulsion or in solution in an inert organic solvent at a temperature of −100° to 100°C. in the presence of an initiator preferably selected from a free-radical generating initiator or a coordination-type initiator; but an anionic or cationic initiator may also be used, depending on the specific cyclopropene and the specific comonomer.

The free-radical-generating initiators may be selected from a wide variety of compounds representative of this type of initiator. Included are the azo initiators, for example, α,α'-azodiisobutyronitrile, 1,1'-azodicyclohexanecarbonitrile, dimethyl α,α'-azodiisobutyrate and α,α'-azodiisobutyramide; the persulfates, for example, potassium persulfate and ammonium persulfate, and the organic peroxides and hydroperoxides, for example, dibenzoyl peroxide, di-t-butyl peroxide, and t-butyl hydroperoxide, and those formed in situ from mixtures of trialkylboranes and oxygen. The initiators can be used in proportions ranging from 0.01 to 10 weight percent of the comonomers being polymerized. Other sources of free radicals for initiating polymerization may also be used such as electron bombardment, ultraviolet light in the presence of a sensitizer, and the like.

Suitable solvents and/or dispersion media for the free-radical copolymerization include water, water containing sodium lauryl sulfate, hydrocarbons such as benzene and hexane, chlorinated aromatic hydrocarbons such as chlorobenzene, nitriles such as acetonitrile, amides such as dimethylformamide and N-methylpyrrolidone, sulfoxides such as dimethylsulfoxide and tetramethylenesulfoxide, and the like. As indicated above, it is not essential that a solvent or dispersion medium be used, and bulk polymerizations can be carried out.

Coordination-type initiators usually involve a combination of a lower valent transition metal chloride with an organometallic compound. Specific combinations which are useful include diisobutylaluminum chloride with vanadium tris-(acetylacetonate), triethylaluminum with vanadium tetrachloride, triisobutylaluminum with titanium tetrachloride, methylmagnesium bromide with titanium tetrachloride, lithium aluminumtetradecyl with titanium tetrachloride and the like. The concentration of initiator may be from 0.01 to 10 weight percent of the monomers being polymerized.

Preferred reaction media for carrying out copolymerizations initiated by coordination-type catalysts are the hydrocarbons, particularly aliphatic hydrocarbons such as hexane and cyclohexane and the halogenated hydrocarbons such as tetrachloroethylene, although aromatic solvents may also be used.

Reaction times can vary from a few seconds (i.e., 5) to several days, for example, two to three days or more depending on the particular comonomers, initiator, solvent, and reaction temperature employed.

Pressures above and below atmospheric pressure are operable. Atmospheric and superatmospheric pressures are preferred, although the partial pressures of those cyclopropenes which are gases at the temperature of operation may be much less than atmospheric. The free-radical-initiated polymerization procedure is preferred for those monomers that are not compatible with coordination-type catalysts. For compatible monomers the latter method is preferred.

The resulting copolymers contain the catenarian structural unit

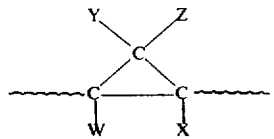

as shown by infrared and proton NMR spectral studies carried out on polymers of the Examples. The several groups can be arranged in more than one spatial configuration, i.e., the W and X groups may be positioned cis or trans; the polymer may be isotactic, syndiotactic, and the like. The cyclopropane catenarian unit may be linked in any manner with regard to the following unit, i.e., head-to-head, head-to-tail, or tail-to-tail. All of these configurations are included within the scope of this invention. In addition, a certain percentage of unsaturated (olefinic) units may be introduced into the chain by copolymerization with a diene or by ring opening of the three-membered ring during or subsequent to polymerization. Such units are potential sites for conventional crosslinking reactions, for example with sulfur compounds. As is evident above, all of these various isomers are intended to be represented by the empirical structural formulae given.

In general, the copolymers of this invention have higher softening points than the corresponding homopolymers prepared solely from the unsaturated polymerizable monomer. The increased softening point is due to the presence of the cyclopropane ring in the polymer chain. The copolymers are thermoplastic and can be formed into films useful for packaging and fibers useful for textiles by means known in the art.

These copolymers are markedly different from copolymers having the catenarian unit

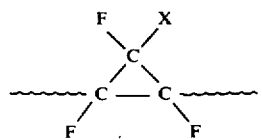

where X is fluorine or other halogen, as disclosed in the Barkdoll and Sargeant patent. Some ways in which polyfluorinated cyclopropane moieties differ from the cyclopropane units of Formula 1 are as follows:

1. Cyclopropanes possessing the $CF_2$ unit undergo a characteristic thermal reaction involving loss of $CF_2$ at temperatures in the range 160°–200°C. J. M. Birchall, R. N. Haszeldine and D. W. Roberts, Chemical Communications, (1967), 287. This thermal reaction is not characteristic of other cyclopropanes.

2. Cyclopropanes react with a variety of electrophilic reagents to give addition products (see, e.g., E. E. Royals "Advanced Organic Chemistry" Prentice-Hall, New York, 1954, p. 213). These reactions are not characteristic of polyfluorinated cyclopropanes, which are much less basic than ordinary hydrocarbons. M. Hudlicky, "Chemistry of Organic Fluorine Compounds", Macmillan Co., New York, 1962, p. 310.

3. Solubilities of fluorocarbons in organic solvents are usually very much lower than those of the corresponding hydrocarbons making highly fluorinated polymers difficult to process. M. Hudlicky, "Chemistry of Organic Fluorine Compounds", Macmillan Co., New York, 1962, p. 304–305.

EMBODIMENTS OF THE INVENTION

The following examples illustrate the invention in further detail, but are not meant to limit the invention in any respect. Parts are by weight and temperature is in degrees Centigrade unless otherwise indicated. From the discussion above, it will be evident that the empirical formulae given include all possible random linear copolymers of the respective monomers.

EXAMPLE 1

1-Methylcyclopropene-Ethylene Copolymer

A 100 ml. 3-necked flask was equipped with a rubber serum cap on one neck, a nitrogen inlet on the second and a dry-ice condenser with a nitrogen outlet on the third neck, plus a Teflon coated magnetic stirring bar. The system was baked out with a heat gun with a stream of dry nitrogen flowing through. It was then cooled under a slow stream of nitrogen and 40 ml. of spectrograde hexane, dried over molecular sieves, was injected through the septum. The flask was cooled to −20° still under nitrogen and one ml. of a 1 M solution of vanadium tetrachloride in isooctane was injected through the septum followed by 2.5 ml. of 1 M triethylaluminum in isooctane.

The flow of nitrogen was replaced by a stream of polymerization grade ethylene at about 40–50 ml./min. which was bubbled through a small trap containing 1.6 g. of 1-methylcyclopropene at −25°, and then into the three-necked flask with vigorous stirring. After about 30 minutes, the ethylene stream was diluted with about 4 times as much nitrogen, and the total flow rate readjusted to 40–50 ml./min. The cyclopropene reservoir was warmed to −20°. Gas chromatographic analysis of the combined ethylene, nitrogen, methylcyclopropene gas stream showed about 3 parts of ethylene per part of methylcyclopropene. After addition of the methylcyclopropene was complete (as evidenced by its disappearance from the reservoir), the ethylene flow was terminated and the reaction mixture was maintained under nitrogen overnight.

The product mixture was poured into 250 ml. of absolute methanol containing 1 ml. of concentrated hydrochloric acid and a pinch of phenyl β-naphthylamine. The precipitate was washed twice with methanol and collected with suction. The rubbery material was dried in vacuum to yield 2.2 g. of solid, m.p. ~220°. A film was pressed at 180° and 1000 p.s.i. for 1 min.

A portion of the polymer, 0.5 g., was dissolved in 30 ml. of cyclohexane overnight, the solution filtered, and the polymer precipitated with methanol. This material after drying was pressed into a film.

EXAMPLE 2

1-Methylcyclopropene-Ethylene Copolymer

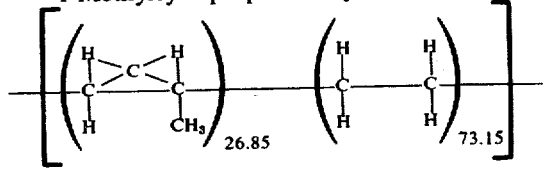

A 100 ml. 3-necked flask was provided with a gas inlet tube in one neck, a dry-ice condenser in the second neck and a serum cap on the third neck, a magnetic stirrer and a cooling bath. Dry nitrogen was passed via a flow-meter through two three-way stopcocks so arranged that the nitrogen could be diverted through a reservoir containing 1-methylcyclopropene [F. Fisher and D. E. Applequist, J. Org. Chem. 30, 2089 (1965)] or could be adjusted to by-pass this reservoir. In either case, the nitrogen was next passed through a tube containing a "T" inlet which was attached via a second flow-meter to an ethylene cylinder. From the other leg of the T the nitrogen went past a serum cap sampling port, into the first neck of the 100 ml. flask, up through the dry-ice condenser and out through a mineral oil-filled bubble counter. With the nitrogen by-passing the reservoir, the flask and condenser were baked out by application of a stream of hot air from a heat gun while a rapid stream of nitrogen was passing through the system.

After the apparatus had cooled, the nitrogen was slowed to 100 ml./min., and 80 ml. of spectrograde hexane, dried over molecular sieves, was injected through the neck containing the serum cap; the flask was cooled to −20°C. Then 2 ml. of 1 molar $VCl_4$ in isooctane was injected through the same port. Finally, 5 ml. of 1 molar triethylaluminum in isooctane was injected with vigorous magnetic stirring. The methyl cyclopropene reservoir which comprised a tube with an inlet extending nearly to the bottom and an outlet near the top was charged with 4.3 g. (.08 mole) of methylcyclopropene. The nitrogen flow was then switched by means of the two three-way stopcocks so as to flow through the inlet tube of the reservoir and to evaporate some of the methylcyclopropene, and thence to proceed by the previously described path into the 100 ml. 3-necked flask. The reservoir was maintained at −20°. As soon as the nitrogen was diverted through the methylcylopropene reservoir, the ethylene was admitted via the T tube so that it mixed with the nitrogen-methylcyclopropene stream before entering the flask. The rate of ethylene addition was set at 10 ml./min. The relative amounts of ethylene and methylcyclopropene in the gas stream were monitored by taking samples from the inlet gas stream via a small serum cap with a gas syringe and analysis by gas chromatography.

The flow of ethylene and nitrogen-methylcyclopropene was led into the 100 ml. 3-necked flask for one hour during which time the flask was stirred vigorously and was maintained at −20°. At the end of one hour all of the methylcyclopropene had evaporated from the reservoir and the ethylene flow was terminated. The reaction was stirred overnight with gradual increase in temperature from −20° to room temperature and with a constant slow flow of nitrogen passing through the system.

The contents of the 100 ml. flask were poured into a mixture of 500 ml. methanol and 2 ml. concentrated hydrochloric acid plus a pinch of phenyl β-naphthylamine and stirred for 10 minutes. The solid was separated by decanting and was washed in a high speed blender with methanol containing a pinch of phenyl β-naphthylamine. The filtered copolymer was dried in vacuum at room temperature and weighed 3.6 g. The m.p. was approximately 190°–200°. It could be pressed into a tough film at 220°C. The film was suitable for packaging.

This material was stirred for one hour with 200 ml. of benzene and centrifuged to yield a clear solution plus a gel. The clear solution was added to excess methanol and a little phenyl β-naphthylamine and the precipitate collected by decantation. After drying in vacuum, it weight 1.57 g.

Carbon Analysis: 88.18, 88.49%
Hydrogen Analysis: 11.59, 11.81%
This corresponds to 16% $C_2H_4$, 84% $C_4H_6$ in the polymer (by weight).
Thermogravimetric Analysis (TGA) at 6°/min. showed 5% wt. loss at 359°C.
Differential Thermal Analysis (DTA) showed a glass transition temperature (Tg) at 45°C., large exotherm commencing at 170°C. and cresting at 351°C.
Inherent Viscosity 0.1% in benzene 25° = 0.75.

EXAMPLE 3

1-Methylcyclopropene-Ethylene Copolymer

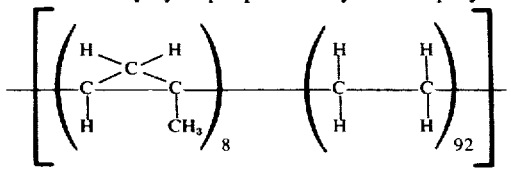

The reactor consisted of a 500 ml. polymer kettle which by means of Y-connectors was fitted with seven necks. The central neck contained a trubore mechanical stirrer which was provided with four paddles for better agitation. The second neck contained a gas inlet tube which extended almost to the bottom of the kettle; the third neck held a thermometer extending into the kettle; the fourth neck held a dry-ice condenser through which the effluent gas passed; the fifth neck held a 100 ml. pressure-equalized addition funnel; the sixth, a 50-ml. water-jacketed slow addition funnel; and the seventh neck was provided with a serum cap.

The apparatus was dried by application of heat while a stream of dry nitrogen was passed through On cooling, 250 ml. of hexane, which had been dried over molecular sieves, was added. The kettle was cooled to 0° (internal temperature) and the hexane was saturated with ethylene by passage of dry ethylene through the gas inlet tube for 10 minutes and a few ml. of a solution of 5.1 g. (0.094 mole) of 1-methylcyclopropene dissolved in 35 ml. dry hexane was added from the water-jacketed addition funnel. Next, 0.42 ml. of triethylaluminum solution (1M in isooctane) was injected through the serum cap.

The reaction was commenced by addition of about 10 ml. of a solution of 0.25 millimoles of $VCl_4$ in 50 ml. of dry hexane. From this point on, the remainder of the $VCl_4$ solution was added at a constant rate over a 40-minute period. The methylcyclopropene solution was added simultaneously, but for a total of 90 minutes. The ethylene flow was maintained at a constant 500 cc./min. during this 90-minute period. Triethylaluminum injections (0.42 ml. 1M) were made 10 and 30 minutes after commencing the reaction.

At the end of the 90 minutes, the reaction was quenched by the addition of 7 ml. of 2-propanol and the product was poured into a blender containing 200 ml. of methanol and 10 ml. of glacial acetic acid. It was washed with this mixture and then three times more in this fashion with methanol.

A film of this product, pressed at 140°, possessed IR maxima at 3049 cm⁻¹ and 1018 cm⁻¹ characteristic of the cyclopropane moiety and peaks at 1374 cm⁻¹ and 868 cm⁻¹. In addition, it contained the usual peaks of crystalline polyethylene. The dry weight of the product was 5.6 g.

| Analysis: | %C 85.96, 86.21 |
|---|---|
|  | %H 13.24, 13.21 |

This corresponds to 8 mole per cent methylcyclopropene, 92 mole per cent ethylene.

A 2.0 g. portion of this polymer was extracted with 25 ml. of benzene per gram for 2 hr. at 25°. On recoagulation with methanol and drying, the benzene-insoluble portion weighed 1.2 g.

This benzene insoluble fraction had the following properties:

| Analysis: | %C 85.32, 85.52 |
|---|---|
|  | %H 13.74, 13.78 |

(Corrected to 100%, this corresponds to 9 mole per cent methylcyclopropene)
Inherent viscosity (125°C. in tetralin, 0.1%) = 2.29, 2.07
DTA, reproducible melt crest at 113°C. Exotherm starts at 400° and crests near 443°C.
TGA, 5% loss at 421°C.
Mwt. (by Gel Permeation Chromatography in trichlorobenzene at 135°) = 38,000, $M_w/M_n$ = 3.9 ± 20%.

EXAMPLE 4

1-Methylcyclopropene-Acrylonitrile Copolymer Bulk Preparation

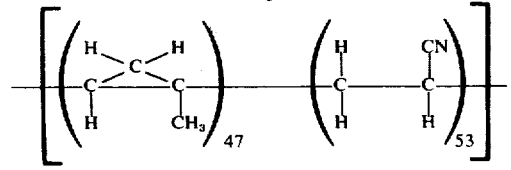

In a 100 ml. round-bottomed flask equipped with a nitrogen inlet, dry-ice condenser and serum cap, there were placed 5 ml. (4.05 g. = 0.076 mole) of chromatographically purified acrylonitrile and a magnetic stirring bar. The flask was cooled to −40° and 4.1 g. (0.076 mole) of 1-methylcyclopropene was added by bubbling nitrogen through a reservoir which contained a small tube with a nitrogen inlet extending to the bottom and an outlet leading to the flask. When addition was complete, 0.10 ml. of 2 molar triethylborane in isooctane was added to the flask through the serum cap via a hypodermic syringe. Then 1.4 ml. of gaseous oxygen was injected into the flask under the surface of the magnetically stirred solution via a hypodermic syringe with a long needle. The solution was stirred at −40° for about 10 minutes when the stirrer stopped due to the high viscosity of the mixture. The mixture was maintained at −40° under nitrogen for a further 200 minutes and then warmed to room temperature and opened to the atmosphere. The product was dissolved in dimethylformamide containing a little phenyl β-naphthylamine.

The above solution was poured slowly into 600 ml. of methanol and the precipitate formed was put in a blender and shredded, then filtered with suction. It was air dried and then dried in a vacuum oven at 70° for 3 days. This copolymer weighed 2.82 g. It possessed the following properties:

It pressed into a clear film at 184°/5000 p.s.i.
The infrared of this film showed strong bands at 3040 cm[116] [1], 2230 cm[116] [1], 1670 cm$^{-1}$ plus others.

| Analysis: | %C 77.58, 77.58 | This corresponds to 47 mole % methylcyclopropene - 53 mole % acrylonitrile. |
|---|---|---|
| | %H 8.35, 8.46 | |
| | %N 13.67, 13.73 | |

DTA Endothermic shifts starting at 4°C. and 125°C. Exothermic region began near 345°C. with crests at 373° and 403°C.

TGA 5% loss at 371°C.
Inherent Viscosity 0.1% DMF at 25° = 0.99.
The n.m.r. in DMSO-D$_6$ shows absorption at $\delta$ = 0.42, 0.74, 0.90, 1.19, 1.30, 1.62, 1.76, 2.06, and 2.52 p.p.m. rel. to internal TMS in o-dichlorobenzene. It is different from polyacrylonitrile or a block copolymer of ethylene and acrylonitrile in that it has only weak absorption in the region $\delta$ = 2.06 p.p.m. and is essentially devoid of absorption in the region $\delta$ = 3.01, while the latter have strong absorption in these regions.

EXAMPLE 5

1-methylcyclopropene-Acrylonitrile Copolymer Slurry Preparation

In a 100 ml. 3-necked flask provided with magnetic stirrer, gas inlet tube, dry-ice-type condenser and serum cap, were placed 10 g. (0.18 mole) of highly purified acrylonitrile which had been freshly distilled from 0.2 ml. of phosphoric acid. To this was added 100 ml. of deaerated, distilled water, and the system was flushed slowly with nitrogen, coming in through the gas inlet tube and exiting through the top of the condenser. This mixture was heated to 50°, and 5 ml. of a solution containing 2.5 × 10$^{-4}$ moles of sulfuric acid and 2.5 × 10$^{-4}$ g. of ferrous ammonium sulfate hexahydrate was injected through the serum cap. Next, 0.025 g. K$_2$S$_2$O$_8$ in 6.25 ml. of water and 0.125 g. sodium metabisulfite in 12.5 ml. of water was injected. The dry-ice type condenser was filled with wet ice-acetone, and 1.6 g. 1-methylcyclopropene was added to the reaction mixture by evaporating it with the inlet nitrogen stream. The addition required only a few minutes.

After 1 hour at 50° (from the time methylcyclopropene addition commenced), the reaction mixture was quenched by the addition of 100 ml. 1% sodium carbonate solution. The copolymer was collected with suction, washed with 100 ml. water and then 25–35 ml. ethanol and was dried in vacuum. Dry weight = 3.9 g.

| Analysis: | %C | 68.17, | 68.49 |
|---|---|---|---|
| | %H | 6.26, | 6.10 |

-continued

| | %N | 24.06, | 24.23 |
|---|---|---|---|

If corrected to 100%, this corresponds to ca. 7% methylcyclopropene (wt. or mole %).

The product was soluble in dimethylformamide and had an inherent viscosity in DMF at 25°, 0.1% of 2.57.

The TGA showed 5% loss at 350°C.
DTA: possible T$_g$ at $-46$°C., shallow endotherm with projected crest at 37°C.

EXAMPLE 6

1-Methylcyclopropene-Styrene Copolymer

In a heavy wall polymer tube was placed 0.051 g. of $\alpha, \alpha'$-azobisisobutyronitrile, and the neck of the tube was partially constricted in a flame. Then 5 ml. (4.5g. = 0.043 mole) of redistilled styrene was added with a hypodermic syringe. The contents of the tube were degassed three times under vacuum and 2.3 g. (0.043 mole) of 1-methylcyclopropene was condensed in the tube. The tube was cooled with liquid nitrogen and sealed under vacuum.

The tube was heated at 50° for 20 hr., at 75° for 60 hr., and at 100° for 40 hr. The tube was cooled and opened to give a clear, colorless viscous oil which was precipitated by addition to excess methanol. This gave 5.6 g. of white solid copolymer.

| Analysis: | %C | 91.34, | 91.61 | This corresponds to 12–24% 1-methylcyclopropene incorporation. |
|---|---|---|---|---|
| | %H | 8.32, | 8.16 | |

DTA shows T$_g$ at 6° and an endotherm (melt?) at 132°C.
TGA 5% loss at 355°C.
Inherent viscosity 0.1% in benzene at 25° = 0.12.

EXAMPLE 7

3,3-Dimethyl-1-Cyanocyclopropene-Acrylonitrile Copolymer

The monomer 3,3-dimethyl-1-cyanocyclopropene was prepared from cyanoacetylene [s. Murahashi, T. Tukizawa, S. Kurioka, and S. Mackawa, Nippon Kagau Zasshi, 77, 1689 (1956); Chem. Abstracts; 53, 5163f (1959); C. Moureu and J. -Ch. Bongrand, Ann. Chim, 14, 47 (1920)] and 2-diazopropane [A. C. Day, P. Raymond, R. M. Southam, and M. C. Whiting, J. Chem. Soc. (C) 468 (1966)] as follows:

A solution of 2-diazopropane obtained from 30 g. of acetone hydrazone by the method of Whiting, et al.

above was slowly added with stirring to a solution of 7.0 g. of cyanoacetylene in 100 ml. of ether. The mixture was kept at 0° during the addition. The red color of the 2-diazopropane disappeared immediately on contact with the cyanoacetylene solution. The solvent was then evaporated at 20 mm. pressure and 25° to yield 6.4 g. of a yellowish oil. The n.m.r. of this oil showed two singlets at δ = 1.51 and 7.79 p.p.m. in the approximate ratio of 6:1. Recrystallization of this oil three times from ethanol at −78°C. and drying in vacuum yielded 3.1 g of 3,3-dimethyl-5-cyanoisopyrazole (I) as white crytals, m.p. 30.8°–31.4°C.

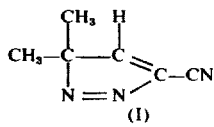

| Carbon Analysis | 60.00, 59.96, 57.84 | Calc. 59.49 |
| Hydrogen Analysis | 5.82, 5.87, 5.52 | 5.82 |
| Nitrogen Analysis | 32.74, 32.84, 34.44, 34.55 | 34.69 |

The nuclear magnetic resonance spectrum consisted of only two singlets at δ = 1.55 p.p.m. and 7.81 p.p.m. from internal tetramethylsilane, in the exact ratio of 6:1. The infrared spectrum in chloroform exhibited strong maxima at 3030 cm.$^{-1}$, 2252 cm.$^{-1}$, 1468 cm.$^{-1}$, 1460 cm.$^{-1}$, 1282 cm.$^{-1}$, 1225 cm.$^{-1}$, 973 cm.$^{-1}$, 943 cm.$^{-1}$, and 856 cm.$^{-1}$ plus other weaker maxima.

A solution of 1.21 g. of 3,3-dimethyl-5-cyanosiopyrazole (I), in 240 ml. of anhydrous ether was degassed by bubbling nitrogen through for 20 min. It was then irradiated for 50 min. at 0° with a Hanovia 450 watt medium pressure mercury lamp through a Pyrex filter at 0°. A total of 214 ml. of nitrogen gas was evolved during this irradiation. Cautious evaporation of the resulting solution at 20 mm. pressure and 25°C. yielded an oil which was rapidly distilled at ca. 0.1 mm. pressure into a receiver cooled in Dry-Ice acetone. This product partially solidified at this temperature. The n.m.r. of this material shows two singlets in CDCl$_3$ at δ = 1.33 and 8.33 p.p.m. in the ratio of 6:1. The infrared in CHCl$_3$ showed strong bonds at 2224 cm.$^{-1}$ and 1725 cm.$^{-1}$ plus several other maxima. This evidence clearly establishes the structure as 3,3-dimethyl-1-cyanocyclopropene, (II).

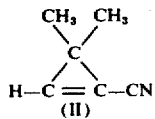

This product decomposed exothermally above room temperature to yield a residue which was insoluble in CCl$_4$ but soluble in CHCl$_3$. The n.m.r. showed loss of olefinic hydrogen indicating that a polymeric material had been formed.

A solution of freshly distilled 3,3-dimethyl-l-cyanocyclopropene, (1.4 g.), acrylonitrile (2.4 g.), and toluene (0.27 g.), was injected into a 50 ml. Ace "mini-reactor" provided with a mechanical stirrer and serum cap. The mixture was cooled to −40° and stirred for 10 minutes under a stream of nitrogen. Then 50 microliters of a freshly-prepared 2 M triethylborane solution in hexane was injected. The nitrogen flow was changed to static (not flowing through the reactor) and 0.7 ml. of oxygen gas was injected well into the reaction system. The mixture was stirred for 77 minutes at −40° and a second shot of catalyst (50 microliters Et$_3$B and 0.7 ml. O$_2$ gas) was given. The mixture was stirred at −40° for 56 more minutes and then warmed to −20° and stirred for 30 minutes. At the end of this time, 30 ml. of methanol was injected and the slurry was collected with suction and washed with more methanol. After drying in vacuum, this material weighed 0.44 g.

A portion of this material was pressed into a film at 245°/5000 p.s.i. This clear film had a split CN peak at 2262 cm.$^{-1}$. Other peaks were at 3663, 3456, 3195, 2976, 2755, 2227, 2179, 1634, 1475, 1460, 1391, 1379, 1351, 1304, 1114, 1060, 973, and 965 cm.$^{-1}$ (on further drying the 3663 and 3456 peaks disappeared).

The n.m.r. (D$_6$-DMSO) showed three major regions of absorption (rel. to D$_5$-DMSO at 150 Cps): δ = 3.0–3.4 (rel. area ca. 1.1), δ = 1.8–2.4 (rel. area ca. 4.5), and δ = 0.9–1.7 (rel. area ca. 11). Under the same condition, polyacrylonitrile has two regions at δ = 2.8–3.4 (rel. area ca. 1) and δ = 1.7–2.4 (rel. area = 1.8). Thus the new region, δ = 0.9-1.7 must be due to the gem-CH$_3$-groups of the cyclopropane function. No detectable olefinic absorption was observed.

| Analysis: For C$_3$H$_3$N (Fwt. 53.06) | | | | |
|---|---|---|---|---|
| | % C | % H | % N | Total |
| Calc. | 67.90 | 5.70 | 26.40 | 100. |
| For C$_6$H$_7$N (Fwt. = 93.12) | | | | |
| | % C | % H | % N | Total |
| Calc. | 77.38 | 7.58 | 15.04 | 100. |
| Found | 72.59 | 6.95 | 19.46 | 99.00 |
| | 72.68 | 6.89 | 19.49 | 99.06 |

Conv. to 100% (dividing % by .9903), this corresponds to 56 mole % acrylonitrile.

The copolymer shows a 5% wt. loss at 322°C. and a was a 50% loss at 381° on TGA. The DTA shows a possible Tg at −30° and another at +6°, plus a reproducible probable Tm at 225°–235°C. The inherent viscosity in DMF at 25° was 0.51 (0.1%).

EXAMPLE 8

3,3-Dimethyl-1-Cyanocyclpropene-Methyl-Methacrylate Copolymer -dimethyl-1-cyonocyclopropene (2 M

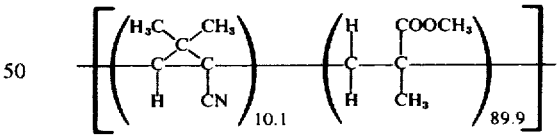

The monomer, 3,3-dimethyl-1-cyanocyclopropene was prepared as in Example 7. Methyl methacrylate was a distilled sample of commercial monomer grade which had been stored at −78°. In a 50 ml. Ace "mini-reactor " equipped with a stirrer of the type whereby gas could come through the middle and up under the agitator through the solution was placed a mixture of 0.8 g. (0.0086 mole) of freshly distilled 3,3-dimethyl-1-cyanocyclopropene and 2.4 g. (0.024 mole) redistilled methyl methacrylate. This mixture was cooled to −40° under nitrogen and 0.05 ml. of 2 M triethylborane in hexane was added through a serum cap. Then 0.7 ml. of oxygen gas was added to the nitrogen stream which was passed slowly through the stirrer and into the solution. After 48 minutes at −40° the mixture was warmed to −35° and a second injection of 0.05 ml. 2 M triethylborane and 0.7 ml. of oxygen was made. After 60 minutes more the bath was warmed to −30° and then after 120 minutes to =20°. A third injection of triethylborane and oxygen (0.05 ml. and 0.7 ml. respectively) was made at this time. After one hour at −20° the mixture was allowed to warm over three hours to +10°. The reaction was then quenched by addition of 0.5 ml. 2-propanol and the mixture was poured into methanol to precipitate the polymer. After washing with methanol and air drying, the polymer weighed 0.40 g. It was further dried in vacuum at 130°.

%C, 61.53, 61.43; %H, 8.38, 8.56; %N, 1.58, 1.52.

This corresponds to 9.5 ± 1% incorporation of 3,3-dimethyl-1-cyanocyclopropene (w/w). The infrared of a clear film pressed at 190° and 12,000 p.s.i., showed maxima at 3448 cm.$^{-1}$ (W), 2994 cm.$^{-1}$ (v.s.), 2950 cm.$^{-1}$ (v.s.), 2849 cm.$^{-1}$ (m), 2227 cm.$^{-1}$ (m.w.) = CN, 1718 cm.$^{-1}$ (v.s.) = ester C=O, 1431 cm.$^{-1}$ (v.s.), 1385 cm.$^{-1}$ (s), 1359 cm.$^{-1}$ (m), a broad maximum from 1280 to 1100 cm.$^{-1}$ (v.v.s.), 1060 cm.$^{-1}$ (m), 965 cm.$^{-1}$ (m.s.), 911 cm.$^{-1}$ (m), 842 cm.$^{-1}$ (m), 827 cm.$^{-1}$(m.w.), 810 cm.$^{-1}$ (m.w.), 750 cm. (s).

The n.m.r. in $D_6$-DMSO ( with $D_5$-DMSO as internal standard) showed broad maxima in the regions δ = 3.90–3.33, peaking at δ = 3.75 p.p.m., (rel. area = 65); at δ = 3.27 p.p.m. (rel. area = 13 ); δ = 2.23-1.57 p.p.m. peaking at δ= 1.87, (rel. area = 28); and at δ = 0.23-1,57 p.p.m., peaking at δ=0.93 (rel. area =105).

The material had an inherent viscosity of 0.20 (0.1% in DMF at 25°.

EXAMPLE 9

Copolymer of Acrylonitrile and 3,3-Bis(trifluoromethyl)cyanocyclopropene

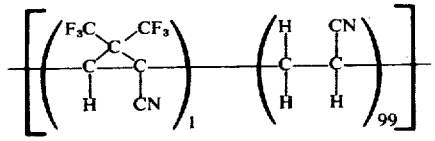

Part A - 3,3-Bis(trifluoromethyl)-5-cyano-3H-pyrazole

A sealed glass tube containing 36.2 g of bis(trifluoromethyl)diazomethane and 10.2 g of cyanoacetylene was heated at 50°C for 24 hours. The product was distilled to give 40.1 g of 3,3-bis(trifluoromethyl)-5-cyano-3H-pyrazole, bp 38°C/12 mm. The ultraviolet, infrared, and mass spectra as well as the proton and fluorine nuclear magnetic resonance spectra were consistent with the proposed structure.

| | Anal. Calcd for $C_6HN_3F_6$: | | | |
|---|---|---|---|---|
| | C, 31.46; | H, 0.44; | N, 18.34; | F, 49.75 |
| Found: | C, 31.63; | H, 1.00; | N, 18.52; | F, 49.42 |
| | 31,50 | 0.95 | 18.51 | 49.41. |

Part B - 3,3Bis(trifluoromethyl)cyanocyclopropene

A 100-ml round-bottom flask containing 67.1 g of 3,3-bis(trifluoromethyl)-5-cyano-3H-pyrazole and a magnetic stirring bar was kept at 25°C by means of a water bath. The vapor was pumped into a cold trap (−196°C) through a 30-inch (heated length) by 1-inch diameter quartz-chip-packed quartz tube heted to 350°C. The pressure of the system was maintained at about 0.5 mm. The trap was warmed to room temperature at atmospheric pressure and was found to contain 56.9 g of essentially pure 3,3-bis(trifluoromethyl)-cyanocyclopropene. The infrared spectrum and the proton and fluorine nuclear magnetic resonance spectra were consistent with the proposed structure.

| | Anal. Calcd. for $C_6H_1NF_6$: | | | |
|---|---|---|---|---|
| | C, 35.83; | H, 0.50; | N, 6.97; | F, 56.69 |
| Found: | C, 35.84; | H, 1.27; | N, 7.38; | F, 58.14 |
| | 35.98 | 1.02 | 7.47 | 58.03. |

Part C - Copolymer of Acrylonitrile and 3,3-Bis(trifluoromethyl)cyanocyclopropene

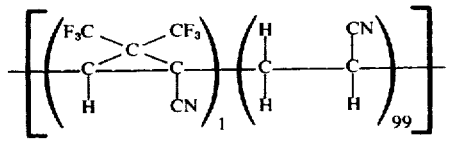

In a glass pressure bottle were placed in order the following materials:

1 g of acrylonitrile
1 g of 3,3-bis(trifluoromethyl)cyclopropene-1-carbonitrile
7.0 g of oxygen-free distilled water
1.25 g of a solution of 1.0 g of potassium persulfate in 125 ml of oxygen-free distilled water
0.5 g of a solution of 4 mg of ferrous ammonium sulfate and 16 ml of 0.1N sulfuric acid in 80 ml of oxygenfree distilled water
0.2 g of a solution of 1 g of sodium lauryl sulfate in 10 ml of oxygen-free distilled water
1.2 g of a solution of 2.0 g of sodium metabisulfite in 100 ml of oxygen-free distilled water.

The tube was sealed and rotated at 70°C for 16 hours, then the mixture was blended into methanol and filtered. The solid was reblended, filtered, and dried under reduced pressure to give 0.55 g (27.5%) of white powdery acrylonitrile/3,3-bis(trifluoromethyl)-cyanocyclopropene copolymer, inherent viscosity = 1.93 (0.5% in dimethylformamide at room temperature). Anal. Calcd for 97.5 parts by weight of acrylonitrile, 2.5 parts by weight of 3,3-bis(trifluoromethyl)cyclopropene-1-carbonitrile:

| Calcd: | N, 25.9; | F, 1.4 |
|---|---|---|
| Found: | N, 25.6; | F, 1.4 |
| | 25.9 | |

This copolymer was thermoplastic and was melt-pressed at 200°C into a hard, translucent, self-supporting film of the type suitable for packaging.

Other 3,3-bis(perfluoroalkyl) cyclopropene-1-carbonitriles of the formula

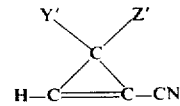

in which Y' and Z', alike or different, are perfluoroalkyl groups of 6 or fewer carbon atoms are prepared by substituting the diazomethanes shown in the Table below for bis(trifluoromethyl)diazomethane in the procedure of Example 9, Part A, and obtaining the indicated corresponding cyclopropenes. These cyclopropenes may be homopolymerized or copolymerized with any of the ethylenic compounds and/or strained ring compounds shown above to obtain copolymers of this invention. Each item in the table includes the preparation of the corresponding 3,3-bis(perfluoroalkyl)-5-cyano-3H-pyrazole as an intermediate.

TABLE

| Item | Diazomethane | Cyclopropene |
|------|--------------|--------------|
| 1 | Bis(pentafluoroethyl)-diazomethane | 3,3-Bis(pentafluoroethyl)-cyanocyclopropene |
| 2 | Trifluoromethylpentafluoroethyldiazomethane | 3-Trifluoromethyl-3-pentafluoroethylcyanocyclopropene |
| 3 | Bis(perfluorobutyl)-diazomethane | 3,3-Bis(perfluorobutyl)cyanocyclopropene |
| 4 | Bis(perfluorohexyl)-diazomethane | 3,3-Bis(perfluorohexyl)cyanocyclopropene |

The 3,3-bis(perfluoroalkyl)cyclopropene-1-carbonitriles of the formula above are prepared by pyrolysis of the corresponding 3,3-bis(perfluoroalkyl)-5-cyano-3H-pyrazoles according to the equation

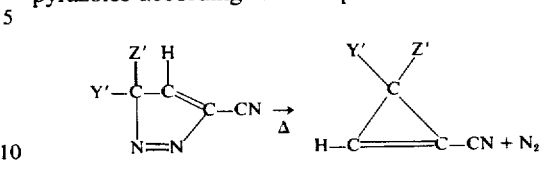

The process may be carried out at temperatures in the range from 200° to 450°C and preferably in the range from 300° to 425°C. The process may be carried out at atmospheric pressure or above, but it is preferred to operate at pressures less than atmospheric pressure. The product cyclopropenes are recovered by cooling to condense them.

When the cyclopropenes of formula II listed below are substituted for 1-methylcyclopropene in the procedures of Examples 2, 4 and 5, the corresponding ethylene, acrylonitrile and styrene copolymers are obtained.

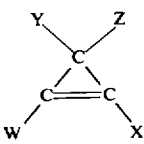

FORMULA II
Cyclopropenes

| Item | W | X | Y | Z |
|------|---|---|---|---|
| 1 | H | H | H | H |
| 2 | H | H | $CH_3$ | H |
| 3 | H | $CH_3$ | $CH_3$ | $CH_3$ |
| 4 | $CH_3$ | $CH_3$ | H | H |
| 5 | $n-C_3H_7$ | $n-C_3H_7$ | $n-C_3H_7$ | H |
| 6 | $n-C_4H_9$ | $n-C_4H_9$ | $COOCH_3$ | H |
| 7 | $n-C_3H_7$ | $N-C_3H_7$ | $COOH$ | H |
| 8 | $CH_3$ | $CH_3$ | $CH_3$ | $CH_3$ |
| 9 | $CH_3$ | $C_6H_5$ | $COOCH_3$ | H |
| 10 | $COOCH_3$ | $CH_3$ | $CH_3$ | $CH_3$ |
| 11 | $C_6H_5$ | $C_6H_5$ | $CN$ | H |
| 12 | $COOH$ | $CH_3$ | $CH_3$ | $CH_3$ |
| 13 | $C_nH_{17}$ | $C_8H_{17}$ | H | H |
| 14 | $C_6H_5$ | $C_6H_5$ | $C_6H_5$ | $CH_3$ |
| 15 | $C_6H_5$ | $C_6H_5$ | $COOC(CH_3)_3$ | H |
| 16 | –C6H4–O–CH3 | –C6H4–O–CH3 | COOH | H |
| 17 | H | H | CN | CN |
| 18 | $CH_3$ | $CH_3$ | $CONH_2$ | H |
| 19 | CHO | H | CHO | H |
| 20 | $n-C_4H_9$ | $n-C_4H_9$ | $CH_2OH$ | H |
| 21 | $C_6H_5$ | $C_6H_5$ | $CH_2OCOCH_3$ | H |
| 22 | $CH_3$ | H | COOH | –C(CH3)(CH2H)–C(CH3H)–COOC2H5 |
| 23 | –C6H4–NO2 | $C_6H_5$ | $COOCH_3$ | $COOCH_3$ |
| 24 | $(CH_2)_7COOCH_3$ | $(CH_2)_7CH_3$ | H | H |
| 25 | $(CH_2)_7CH_2OH$ | $(CH_2)_7CH_3$ | H | H |
| 26 | $C_3H_7$ | $C_3H_7$ | $OCH_3$ | H |
| 27 | $C_6H_5$ | $C_6H_5$ | $O-C(CH_3)_3$ | $C_6H_5$ |
| 28 | CN | H | H | H |
| 29 | $CONH_2$ | H | H | H |
| 30 | $CON(CH_3)_2$ | H | H | H |

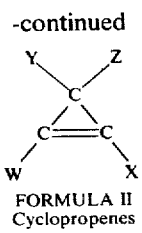

FORMULA II
Cyclopropenes

| Item | W | X | Y | Z |
|---|---|---|---|---|
| 31 | H | H | CH₃ | CH₃ |
| 32 | H | COOCH₃ | CH₃ | CH₃ |
| 33 | H | C₆H₅ | CH₃ | CH₃ |
| 34 | COOCH₃ | COOCH₃ | CH₃ | CH₃ |
| 35 | H | CN | CH₃ | CH₃ |

The cyclopropenes of items, 28, 29 and 30 may be prepared by the following means:

1-Cyanocyclopropene is prepared by the sequence:

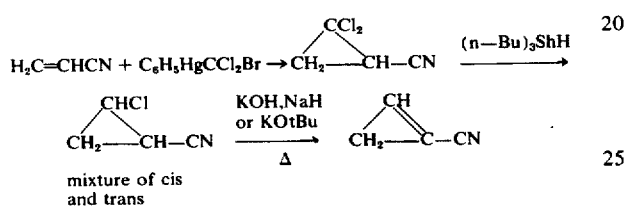

1-Carbamoylcyclopropene is prepared from the chloronitrile by treatment with alkaline peroxide followed by elimination of HCl with base as above:

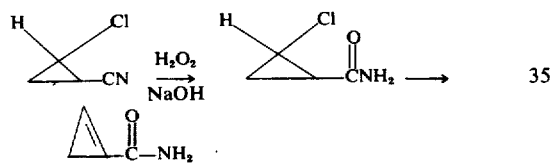

1-(N,N-dimethylcarbamoyl)cyclopropene is prepared by the sequence:

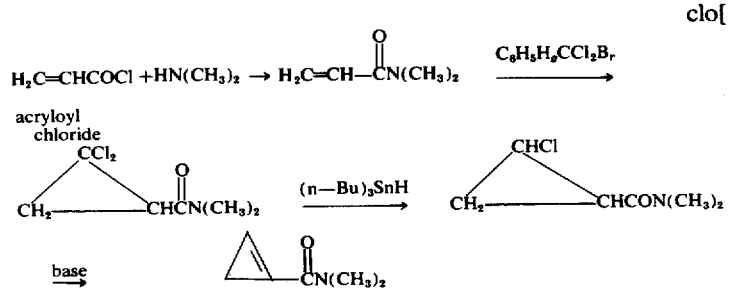

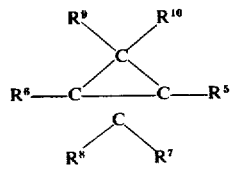

FORMULA III
BICYCLOBUTANES bicyclo[1.1.0]butane
1-hydroxymethylbicyclo[1.1.0]butane
1,3-bis(trifluoromethyl)-2,2,4,4-tetrafluoro-bicyclo[1.1.0]butane
2,4-bis(methoxycarbonyl)bicyclo[1.1.0]butane
2,4-bis(ethoxycarbonyl)-1-methyl-3-phenylbicyclo[1.1.0]butane
1,3-dimethylbicyclo[1.1.0]butane
1-methoxycarbonylbicyclo[1.1.0]butane
1-ethoxycarbonylbicyclo[1.1.0]butane
1-carboxybicyclo[1.1.0]butane
2-carboxy-1,3-diphenylbicyclo[1.1.0]butane
1-propionyloxy-2,2,4,4-tetramethylbicyclo[1.1.0]butane
1-carbamoyl-3-methylbicyclo[1.1.0]butane
2-n-butyl-1-cyano-3(9-heptadecyl)-2-methylbicyclo[1.1.0]butane When the bicyclobutanes of formula III listed below are substituted for part, or all, of the acrylonitrile in the procedures of Examples 4 or 7, the corresponding 1-methylcyclopropene-acrylonitrile-bicyclobutane, 1-methylcyclopropene-bicyclobutane, 3,3-dimethyl-1-cyanocyclopropeneacrylonitrile-bicyclobutane and 3,3-dimethyl-1-cyanocyclopropene-bicyclobutane copolymers are obtained.

1-cyano-4-cyclohexyl-2-cyclopropyl-2,3-dimethylbicyclo[1.1.0]butane
2-benzyl-1-cyano-2-methyl-3-tetradecylbicyclo[1.1.0]butane
1-cyano-3-methyl-2-(β-naphthyl)bicyclo[1.1.0]butane
1-cyano-2-(α-naphthyl)-2-phenyl-3-(1-phenyl-1-p-tolyl)methylbicyclo[1.1.0]butane
1-cyano-3-(β-cyclohexylethyl)bicyclo[1.1.0]-butane
1-cyano-2-cyclohexylmethyl-3-methylbicyclo[1.1.0]-butane
1-phenylbicyclo[1.1.0]butane
1-p-hydroxyphenylbicyclo[1.1.0]butane
1-p-chlorophenylbicyclo[1.1.0]butane 1-ethylthiocarbonylbicyclo[1.1.0]butane
1-chlorobicyclo[1.1.0]butane
3-chloro-1-methoxycarbonylbicyclo[1.1.0]butane
1-methoxybicyclo[1.1.0]butane
1-acetoxybicyclo[1.1.0]butane
1-nitrobicyclo[1.1.0]butane
1-p-tolysulfonylbicyclo[1.1.0]butane
1-N-ethylcarbamoylbicyclo[1.1.0]butane
1-N,N-dimethylcarbamoylbicyclo[1.1.0]butane
1-formylbicyclo[1.1.0]butane
1-($\beta$-hydroxyethyl)bicyclo[1.1.0]butane
1-($\beta$-chloroethyl)bicyclo[1.1.0]butane
2,4-dicyanobicyclo[1.1.0]butane
1,2,3,4-tetracyanobicyclo[1.1.0]butane
2,4-dichlorobicyclo[1.1.0]butane
2,4-bis(methylsulfonyl)bicyclo[1.1.0]butane
2,4-dinitrobicyclo[1.1.0]butane
2,4-diacetylbicyclo[1.1.0]butane
2,4-bis(diethylamino)bicyclo[1.1.0]butane
2,4-bis(n-butoxy)bicyclo[1.1.0]butane
2,4-bis(hydroxy)bicyclo[1.1.0]butane
2,4-dibromobicyclo[1.1.0]butane
2,4-diiodobicyclo[1.1.0]butane
1-acetylbicyclo[1.1.0]butane
sodium bicyclo[1.1.0]butane-1-carboxylate All the copolymers of the present invention can be fabricated into useful self-supporting films. Some compositions, e.g., 1-methylcyclopropene-ethylene copolymers of intermediate composition, have useful elastomeric properties while those of higher cyclopropene content have greater stiffness and are useful for textile fibers. Copolymers with acrylonitrile have greater alkali resistance than acrylonitrile homopolymers.

As many widely different embodiments of this invention may be made without departing from the scope and spirit thereof, it is to be understood that the invention is not limited to the specific embodiments described herein.

The embodiments of the invention in which an exclusive property or privilege is claimed are defined as follows:

1. A copolymer of the formula: Random copolymers, including 1:1:1 alternating copolymers, of the empirical formula:

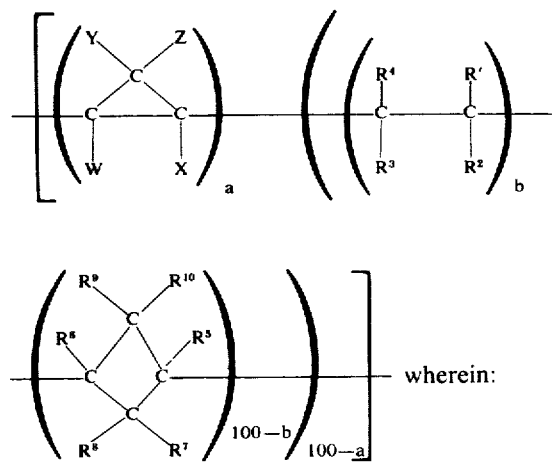

the paranthesis indicate the presence of recurring units of at least one chemical moiety of the formula within the parentheses;

$a$ is the mole percent of cyclopropane units in the copolymer, being any number, including decimal fractions, between 1 and 99;

$b$ is the mole percent of ethane units in the copolymer, being any number from 0 to 100 inclusive;

W, X, Y and Z which may be the same or different, are selected from the group consisting of hydrogen, alkyl of 1-18 carbon atoms, substituted alkyl in which the substituents may be hydroxy or lower alkoxycarbonyl, lower alkoxy, phenyl, substituted phenyl in which the substituents may be fluorine, chlorine, lower alkoxy or nitro, formyl, acetyl, carboxy, lower alkoxycarbonyl, cyano, carbamoyl and N,N-di(loweralkyl) carbamoyl; with the proviso that Y and Z may also be perfluoroalkyl of up to 6 carbon atoms when W is hydrogen and X is cyano;

$R^1$ is selected from the group consisting of hydrogen, halogen, lower alkyl, lower alkenyl, phenyl, lower alkoxy, lower alkylcarbonyl, carboxy, lower alkoxycarbonyl, lower alkylcarbonyloxy, cyano, carbamoyl and N,N-di(loweralkyl)-carbamoyl;

$R^2$ is selected from the group consisting of hydrogen, halogen, lower alkyl, vinyl, halovinyl, loweralkylvinyl, cyano, methylpyridinyl and phenylene sodium sulfonate;

$R^3$ is selected from the group consisting of hydrogen, halogen, carboxy and lower alkoxycarbonyl; and $R^4$ is selected from the group consisting of hydrogen and halogen;

all of the foregoing with the proviso that $R^2$ and $R^3$ taken together may be an alkylene group of 2 to 6 carbon atoms;

$R^5$ and $R^6$ each are selected from the group consisting of hydrogen, halogen, hydroxyloweralkyl, hydroxyphenyl, loweralkoxyloweralkyl, loweralkoxyphenyl, haloloweralkyl, halophenyl, -COOH, -COOR, -COSR, -COOM, -CONH$_2$, -CONHR, -CONR$_2$, -SO$_2$R, -CHO, -COR, -OCOR, -OR, -NO$_2$, -CN and -R, wherein M is one equivalent of a metal cation and R is hydrocarbyl of up to 18 carbons free of ethylenic and acetylenic carbon-to-carbon unsaturation; and $R^7$, $R^8$, $R^9$ and $R^{10}$ are each selected from the group consisting of hydroxy, amino, -NR$_2$ and $R^5$.

2. A copolymer according to claim 1 of the formula

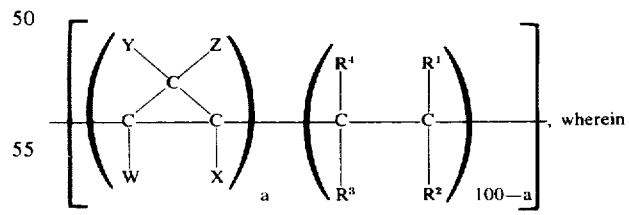, wherein $a$ is the mole percent of cyclopropane units in the copolymer, being any number, including decimal fractions, between 1 and 99;

W, X, Y and Z which may be the same or different, are selected from the group consisting of hydrogen, alkyl of 1-18 carbon atoms, substituted alkyl in which the substituents may be hydroxy or lower alkoxycarbonyl, lower alkoxy, phenyl, substituted phenyl in which the substituents may be fluorine, chlorine, lower alkoxy or nitro, formyl, acetyl, carboxy, lower alkoxycarbonyl, cyano, carbamoyl and N,N-di(loweralkyl)carbamoyl; with the proviso that Y and Z may also be perfluoroalkyl of up to 6 carbon atoms when W is hydrogen and X is cyano;

$R^1$ is selected from the group consisting of hydrogen, halogen, lower alkyl, lower alkenyl, phenyl, lower alkoxy, lower alkylcarbonyl, carboxy, lower alkoxycarbonyl, lower alkylcarbonyloxy, cyano, carbamoyl and N,N-di(loweralkyl)-carbamoyl;

$R^2$ is selected from the group consisting of hydrogen, halogen, lower alkyl, vinyl, halovinyl, loweralkylvinyl, cyano, methylpyridinyl and phenylene sodium sulfonate;

$R^3$ is selected from the group consisting of hydrogen, halogen, carboxy and lower alkoxycarbonyl; and $R^4$ is selected from the group consisting of hydrogen and halogen;

all of the foregoing with the proviso that $R^2$ and $R^3$ taken together may be an alkylene group of 2 to 6 carbon atoms.

3. A copolymer of claim 2 in which at least one of W, X, Y, Z, $R^1$, $R^2$, $R^3$ or $R^4$ is a group as specified in claim 1 other than hydrogen.

4. A copolymer of claim 2 in which at least one of W, X, Y or Z is a group as specified in claim 1 other than hydrogen and at least one of $R^1$, $R^2$, $R^3$ or $R^4$ is a group as specified in claim 1 other than hydrogen or lower alkyl.

5. A copolymer of claim 2 in which W is hydrogen, X is cyano and Y and Z are each perfluoroalkyl of up to 6 carbon atoms.

6. A copolymer of claim 2 wherein Y = Z = hydrogen, W or X is methyl, the other being hydrogen, and $R^1 = R^2 = R^3 = R^4 =$ hydrogen.

7. A copolymer of claim 2 wherein Y = Z = hydrogen, W or X is methyl, the other being hydrogen, $R^1 = R^3 = R^4 =$ hydrogen and $R^2$ is cyano.

8. A copolymer of claim 2 wherein Y = Z = hydrogen, W or X is methyl, the other being hydrogen, $R^1 =$ phenyl and $R^2 = R^3 = R^4 =$ hydrogen.

9. A copolymer of claim 2 wherein Y = Z = methyl, W or X is cyano, the other being hydrogen, $R^1 = R^3 = R^4 =$ hydrogen, and $R^2$ is cyano.

10. A copolymer of claim 2 wherein Y = Z = methyl, W or X is cyano, the other being hydrogen, $R^1 =$ methoxycarbonyl, $R^2 =$ methyl, $R^3 = R^4 =$ hydrogen.

11. A copolymer of claim 2 wherein Y = Z = perfluoromethyl, W is hydrogen, X is cyano, $R^1 = R^3 = R^4 =$ hydrogen and $R^2$ is cyano.

12. A self-supporting film formed from a copolymer of claim 2.

13. A film- and fiber-forming copolymer consisting of 1-methylcyclopropene with one or more ethylenically unsaturated comonomer selected from the group acrylic acid, methacrylic acid, acrylonitrile, and ethyl acrylate.

14. A film- and fiber-forming copolymer consisting of 1-methylcyclopropene with at least one ethylenically unsaturated comonomer selected from the group acrylic acid, maleic anhydride, acrylonitrile, vinyl acetate and vinyl chloride.

15. A film- and fiber-forming copolymer consisting of 1-methylcyclopropene and acrylonitrile, said copolymer having an inherent viscosity of 0.99 when measured at 25°C. in 0.1% solution in dimethylformamide.

16. A copolymer as in claim 15 where the 1-methylcyclopropene makes up from 1 to about 99% of the copolymer.

17. A film- and fiber-forming copolymer consisting of 1-methylcyclopropene and ethyl acrylate.

18. A film- and fiber-forming copolymer consisting of 1-methylcyclopropene and at least one vinyl monomer.

19. A film- and fiber-forming copolymer consisting of 1-methylcyclopropene and one or more ethylenically unsaturated hydrocarbons.

* * * * *

UNITED STATES PATENT OFFICE
CERTIFICATE OF CORRECTION

PATENT NO. : 3,919,227
DATED : November 11, 1975
INVENTOR(S) : Sam Andreades and Richard L. Baird It is certified that error appears in the above-identified patent and that said Letters Patent are hereby corrected as shown below:

Cover page, item [54] - "OR" should be -- OF --.

Column 1, line 1 - "OR" should be -- OF --.

Column 1, line 39 - A new paragraph should start with "3".

Column 1, line 48 - The formula should read

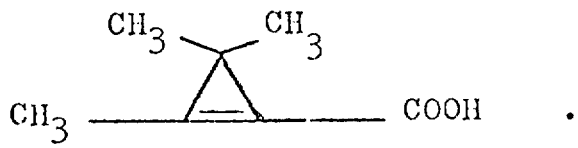

Column 4, line 46 - "It" should be --halogen,--.

Column 4, line 47 - "it" should be --It--.

Column 9, line 61 - First part of formula should be

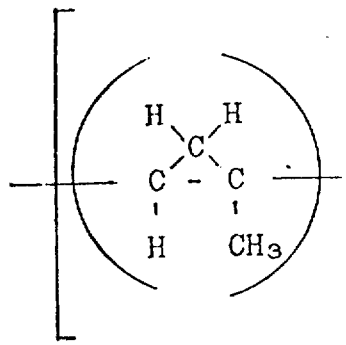

UNITED STATES PATENT OFFICE
CERTIFICATE OF CORRECTION

PATENT NO. : 3,919,227
DATED : November 11, 1975
INVENTOR(S) : Sam Andreades and Richard L. Baird It is certified that error appears in the above-identified patent and that said Letters Patent are hereby corrected as shown below:

Column 13, line 6 - "cm$^{116}$ 1" should be -- cm$^{-1}$ -- (two times).

Column 14, line 60 - "s." should be -- S. --.

Column 15, line 12 - Correct spelling of "crystals".

Column 16, line 46 - Delete "-dimethyl-1-cyonocyclopropene(2M".

Column 17, line 4 - "=20°" should be -- -20° --.

Column 17, line 15 - At beginning of line, insert "Analysis:".

Column 22, line 19 - Formula should be

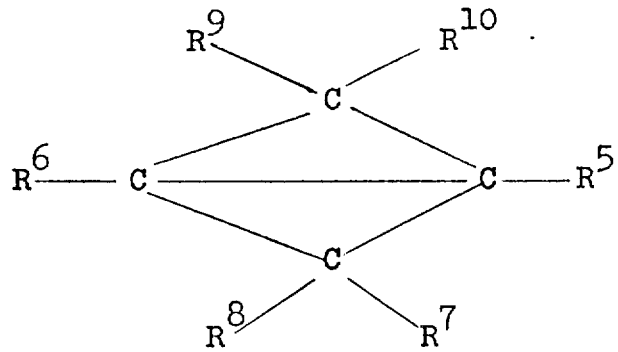

UNITED STATES PATENT OFFICE
CERTIFICATE OF CORRECTION

PATENT NO. : 3,919,227
DATED : November 11, 1975
INVENTOR(S) : Sam Andreades and Richard L. Baird It is certified that error appears in the above-identified patent and that said Letters Patent are hereby corrected as shown below:

Column 23, lines 42-44 - Delete "Random copolymers, including 1:1:1 alternating copolymers, of the empirical formula:"

Column 23, lines 66-68 - Delete "the parenthesis indicate the presence of recurring units of at least one chemical moiety of the formula within the parentheses;"

Signed and Sealed this thirteenth Day of April 1976

[SEAL]

Attest:

RUTH C. MASON
Attesting Officer

C. MARSHALL DANN
Commissioner of Patents and Trademarks